(12) United States Patent
Weiss

(10) Patent No.: US 10,395,312 B2
(45) Date of Patent: Aug. 27, 2019

(54) SYSTEM AND METHOD FOR PROACTIVELY OFFERING FINANCING OFFERS TO CUSTOMERS OF E-COMMERCE WEBSITES

(71) Applicant: Behalf Ltd., RaAnana (IL)

(72) Inventor: Russell Weiss, Modiln Ilit (IL)

(73) Assignee: Behalf Ltd., RaAnana (IL)

( * ) Notice: Subject to any disclaimer, the term of this patent is extended or adjusted under 35 U.S.C. 154(b) by 507 days.

(21) Appl. No.: 14/750,064

(22) Filed: Jun. 25, 2015

(65) Prior Publication Data

US 2015/0294407 A1 Oct. 15, 2015

Related U.S. Application Data

(63) Continuation-in-part of application No. 13/973,429, filed on Aug. 22, 2013, now Pat. No. 9,721,289.

(60) Provisional application No. 62/016,854, filed on Jun. 25, 2014.

(51) Int. Cl.
  G06Q 30/00 (2012.01)
  G06Q 40/02 (2012.01)
  G06Q 30/06 (2012.01)

(52) U.S. Cl.
  CPC ....... *G06Q 40/025* (2013.01); *G06Q 30/0633* (2013.01)

(58) Field of Classification Search
  CPC ............................. G06Q 40/00; G06Q 40/02
  USPC ......................................... 705/26.41, 37, 38
  See application file for complete search history.

(56) References Cited

U.S. PATENT DOCUMENTS

| | | |
|---|---|---|
| 6,629,081 B1 | 9/2003 | Cornelius et al. |
| 7,014,469 B1 | 3/2006 | Nocera et al. |
| 7,155,409 B1 | 12/2006 | Stroh |
| 7,797,214 B2 | 9/2010 | Rosen et al. |
| 7,797,217 B2 | 9/2010 | Rosen et al. |
| 7,938,316 B2 | 5/2011 | Bennett et al. |
| 7,942,316 B2 | 5/2011 | Bennett et al. |
| 8,181,851 B2 | 5/2012 | Bennett et al. |
| 8,214,238 B1 | 7/2012 | Fairfield et al. |
| 2002/0095373 A1 | 7/2002 | Melchior et al. |
| 2005/0065874 A1* | 3/2005 | Lefner ................... G06Q 40/00 705/38 |
| 2005/0149408 A1 | 7/2005 | Kenny et al. |

(Continued)

OTHER PUBLICATIONS

Official Action dated Dec. 14, 2016 From the US Patent and Trademark Office Re. U.S. Appl. No. 13/973,429. (12 pages).

(Continued)

*Primary Examiner* — Rokib Masud

(57) ABSTRACT

A method and system for proactively offering financing offers to customers of e-commerce websites are provided. The method includes collecting data related to a customer associated with a customer node, upon identification that a customer logs on to an e-commerce website; generating at least one customer characteristic of the customer based on the collected data; computing an adaptive credit standing of the customer based on the at least one customer characteristic; determining whether the adaptive credit standing meets a credit standing threshold associated with at least one product of interest; and upon determining that the adaptive credit standing meets the credit standing threshold, providing at least one financing offer to the customer associated with the customer node.

29 Claims, 2 Drawing Sheets

(56) References Cited

U.S. PATENT DOCUMENTS

| | | |
|---|---|---|
| 2005/0149417 A1 | 7/2005 | Crescenzo et al. |
| 2006/0149668 A1 | 7/2006 | Zafrir |
| 2008/0133402 A1* | 6/2008 | Kurian .................. G06Q 40/02 705/38 |
| 2009/0030832 A1* | 1/2009 | Chien ................ G06Q 20/4016 705/37 |
| 2011/0015974 A1 | 1/2011 | Zafrir |
| 2011/0313884 A1* | 12/2011 | Eze .................... G06Q 30/0601 705/26.41 |
| 2013/0138555 A1* | 5/2013 | Shishkov ............ G06Q 40/025 705/38 |
| 2014/0058890 A1 | 2/2014 | Esekow |

OTHER PUBLICATIONS

Official Action dated Jun. 16, 2016 From the US Patent and Trademark Office Re. U.S. Appl. No. 13/973,429.
Advisory Action Before the Filing of an Appeal Brief dated Feb. 28, 2017 From the US Patent and Trademark Office Re. U.S. Appl. No. 13/973,429. (7 pages).

\* cited by examiner

SYSTEM AND METHOD FOR PROACTIVELY OFFERING FINANCING OFFERS TO CUSTOMERS OF E-COMMERCE WEBSITES

CROSS-REFERENCE TO RELATED APPLICATIONS

This application claims the benefit of U.S. Provisional Application No. 62/016,854 filed on Jun. 25, 2014. This application is also a continuation-in-part of U.S. patent application Ser. No. 13/973,429 filed Aug. 22, 2013, the contents of which are hereby incorporated by reference.

TECHNICAL FIELD

The present disclosure relates generally to computerized financing platforms, and more particularly to systems and methods for financing purchase orders over the web.

BACKGROUND

When a customer wishes to buy an item from a supplier and requires financing, the customer often requests terms of repayment from the supplier. The supplier may decline to provide the customer a line of credit if the customer is either unknown to the supplier or the risk of the customer not repaying the supplier is perceived as too great. The customer will then usually contact his or her lending institution to apply for a monetary loan. After checking the customer's business information and business credit standing, as well as their personal information and credit history, a representative of the lending institution informs the customer of the loan amount, period, and interest rate for which he or she is eligible. If the customer agrees to the terms of the loan, the representative of the lending institution delivers documentation to the customer that, when executed, grants the lending institution a security interest in the purchased product for the monetary loan.

The ways in which people purchase goods has significantly progressed since the development of the worldwide web (WWW). Customers can now shop from the convenience of their home, office, or while on the road using portable devices.

With the advantages of electronic commerce (e-commerce), many aspects of the above process for obtaining financing for purchases may now be performed online. However, while these and other online options are often much more convenient than their manual counterparts, they still require time and effort from the customer, and require the customer to provide sufficient securities to the lending institution before financing may be secured. Such solutions therefore cause inconvenience to the user, delaying the user's purchase and discouraging further purchases. Such solutions may additionally increase the computing resources needed to complete a transaction by requiring additional displays to the user and/or inputs from the user before financing may be secured.

In many cases, users browsing e-commerce websites hesitate to make a purchase due to a lack of sufficient funds or available financing. This hesitation results in lost revenue for merchants. Currently, at best merchants can offer payments through already validated means, such as credit cards. The payment offers are the same to all customers regardless if the customer holds or does not hold a credit card. That is, merchants cannot offer financing options tailored to a specific customer. Further, such offers cannot be made as the customer browses an e-commerce website.

It would therefore be advantageous to overcome the limitations of the prior art by providing an effective way for merchants to offer financing options specifically tailored to customers currently browsing their e-commerce websites.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some exemplary disclosed embodiments include a method for proactively offering financing offers to customers of e-commerce websites. The method comprises: upon identification that a customer logs on to an e-commerce website, collecting data related to a customer associated with a customer node; generating at least one customer characteristic of the customer based on the collected data; computing an adaptive credit standing of the customer based on the at least one customer characteristic; determining whether the adaptive credit standing meets a credit standing threshold associated with at least one product of interest; and upon determining that the adaptive credit standing meets the credit standing threshold, providing at least one financing offer to the customer associated with the customer node.

Some exemplary disclosed embodiments include a system for proactively offering financing offers to customers of e-commerce websites, comprising: a processing unit; and a memory, the memory containing instructions that, when executed by the processing unit, configure the system to: upon identification that a customer logs on to an e-commerce website, collect data related to a customer associated with a customer node; generate at least one customer characteristic of the customer based on the collected data; compute an adaptive credit standing of the customer based on the at least one customer characteristic; determine whether the adaptive credit standing meets a credit standing threshold associated with at least one product of interest; and upon determining that the adaptive credit standing meets the credit standing threshold, provide at least one financing offer to the customer associated with the customer node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
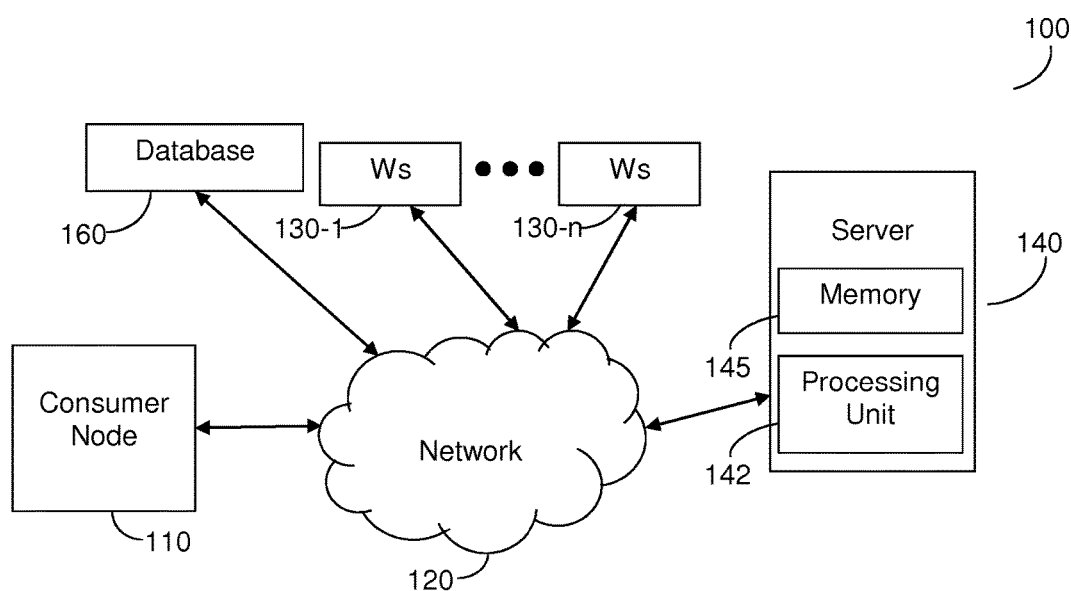
FIG. 1 is a schematic diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a system 100 for enabling web-based purchase order financing according to an embodiment. Accordingly, a customer node 110 is connected to a network 120. The customer node 110 may be, but is not limited to, a personal computer (PC), a laptop computer, a mobile device, and so on. The network 120 may be a wired network or a wireless network, a local area network (LAN), a wide area network (WAN), a metro area network (MAN), the Internet, the worldwide web (WWW), and any combinations thereof.

The customer node 110 can communicate with one or more web-sources 130-1 through 130-n (hereinafter referred to collectively as web-sources 130 or individually as a web-source 130, merely for simplicity), where n is an integer equal to '1' or greater. The web-sources 130 may be electronic commerce (e-commerce) websites, travel websites, services websites, and any other web-sources through which a customer is able to purchase goods or services via the customer node 110. For the sake of simplicity and without limiting the disclosed embodiments, goods and/or services will collectively be referred to as "products" or a "product".

In certain configurations, the system 100 may further include a server 140 and a database 160 connected to the network 120. The database 160 is configured to store, for example, customer characteristics, metadata related to purchase orders, customer black lists, and so on.

A server 140 is communicatively connected to the web-sources 130 via a connection to the network 120. In an embodiment, the server 140 is configured to collect data related to a customer associated with the customer node 110. In an embodiment, the data collection begins when a user of the customer node 110 logs on to, for example, the web-source 130-1. It should be noted that a log on to a web source may include, for example, browsing to a website hosted by the web source 130-1, providing user's credentials to authenticate or sign-in to a website hosted by the web source 130-1, and so on. In some exemplary embodiments, upon log on to a web source 130-1, a script (or any type of executable code) can be downloaded to the customer node 110 allowing collection of data and communication with the server 140.

In one embodiment, the data can be collected, by the server 140, implicitly and/or explicitly. Data is collected implicitly by tracking the customer activity or by capturing and analyzing inputs from one or more sensors associated with the customer node 110 such as, for example, a camera, a voice recorder, and the like. According to another embodiment, the data may be collected explicitly from the customer's responses and/or feedback to questions sent to the customer node 110. Such data may be, for example, a variety of characteristics related to the customer determined via the customer node 110.

Using the collected data, customer characteristics related to the customer associated with the customer node 110 are generated. Customer characteristics may be, for example, facial or voice reactions, mouse scrolling and/or keystrokes, touch screen gestures, and other types of inputs captured with respect to the interaction of the customer node 110 with the user device. The customer characteristics may further include personal information related to the customer, and information demonstrating how the user has previously interacted with the web-source 130-1. The personal information related to the customer associated with the customer node 110 may include, but is not limited to, the customer's email address, the source from which the customer node 110 accessed a web-source 130, the geographic location of the customer node 110, and so on.

In an embodiment, using the customer characteristics, the server 140 is configured to generate an adaptive credit standing of a customer associated with the customer node 110. The adaptive credit standing is determined for the specific customer associated with the customer node 110 respective at least of the generated customer characteristics.

In an embodiment, each of the customer characteristics is analyzed by the server 140 during generation of the adaptive credit standing. According to an embodiment, the analysis is based on a plurality of hierarchical threshold-based stages. At the first stage, it may be determined whether the customer associated with the customer node 110 is a target interest. A customer is a target interest if there is an interest to incentivize the customer to perform a purchase through the web source 130-1 by suggesting via the customer node 110 a financing offer of the purchase order. Whether there is an interest to incentivize the user may be determined based on, but is not limited to, whether the user meets a first stage threshold. In an exemplary embodiment, the first stage threshold may be determined respective of a request received by the customer node 110 to add an item to an electronic shopping cart associated with the web-source 130-1, check a specific product or a product category for a predefined time duration, or across multiple sessions, and so on.

The first stage threshold may be determined by the server 140 by querying a database 160 and may depend on, but is not limited to, whether the customer appears in a customers' black list. In an embodiment, upon determination that the customer does not appear in the black list, it is determined that there is an interest in incentivizing the user to perform a purchase by offering to finance a purchase order and that the customer is a target interest. In that case, the server 140 is configured to continue to the next stage which may be, but is not limited to, generating an adaptive credit standing threshold for financing a purchase order.

The adaptive credit standing threshold is typically used to determine whether a customer passes the minimal requirements for extending any credit. In an embodiment, additional credit and/or other favorable terms may be granted if the customer passes the adaptive credit standing threshold by a predetermined level. In one embodiment, as part of the analysis, a virtual value is generated for each element of the one or more customer characteristics.

In an embodiment, a weighted decision algorithm is utilized to compute the adaptive credit standing. Accordingly, each customer characteristic collected is assigned a virtual value indicating the importance of the respective customer characteristic to the adaptive credit standing. In one embodiment, the weighted decision algorithm computes the credit standing, for example, as an average of a sum of the virtual values. The computation of virtual values may be adjusted based on the total amount of data collected. For example, if only a few elements are collected, then each such collected element will be more significant in the credit determination. As another example, data collected from a credit bureau indicating the customer's financial status may receive a higher virtual value than the customer's comments in a social network website and therefore will be more significant in the determination of the customer's credit.

Respective of the interest in the purchase order, the server 140 is configured to generate metadata related to the purchase order. The metadata may be, for example, the product or service to be ordered, costs associated with the order, and so on. The server 140 is then configured to generate a credit standing threshold to finance the purchase order. The credit standing threshold is generated respective of the metadata. For example, purchase orders featuring higher cost items will typically yield higher credit standing thresholds.

Upon determination that the credit standing of the customer associated with the customer node 110 meets the credit standing threshold, a financing offer is provided to the customer node 110. The financing offer may be embedded in a content item displayed on a display of the customer node 110. Such a content item may represent, for example, an offer to finance the purchase order, a link through which the purchase order can be financed, a guarantee to finance the purchase order, details regarding the credit line, and so on.

In addition, upon determination that the credit standing of the customer associated with the customer node 110 meets the credit standing threshold above a predetermined level, a notification is sent to the customer node 110. The notification may state, for example, that there is additional credit that the customer can use, that additional purchase orders can be financed, and so on.

In some exemplary embodiments, upon determination that the credit standing of the customer associated with the customer node 110 does not meet the credit standing threshold, operation of the system 100 terminates. Alternatively, upon determination that the credit standing does not meet the credit standing threshold, a notification that the customer's credit is insufficient is sent to the customer node 110.

It should be noted that, in an embodiment, the financing offers are made proactively, typically without requiring the customer to request such offers. Thus, the disclosed embodiments incentivize the customer to buy products on a merchant's web source 130. It should be further noted that the operation of the system 100 as described herein can be executed automatically and without the customer's explicit involvement, thereby enabling merchants to interact with the customer only upon determination that the customer has a credit standing that meets the credit standing threshold to finance the purchase order.

It should be appreciated that such automatic execution reduces consumption of computing resources by minimizing data transferred between the customer node 110 and the web source 130-1. In particular, customers that do not pass the minimal thresholds set by the owner of the web-source 130 may be automatically filtered out such that only serious potential customers are fully analyzed. Further, full analysis of serious potential customers does not require significant communications between the customer node 110 and the web-source 130 because data related to such customers may be collected and analyzed in real-time.

In some implementations, the server 140 typically includes a processing unit 142 connected to a memory 145. The memory 145 contains a plurality of instructions that are executed by the processing system. Specifically, the memory 145 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The processing unit 142 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The memory 145 further contains instructions that, when executed by the processing unit 142, configures the server 140 to process the disclosed embodiments.

Figure 2:
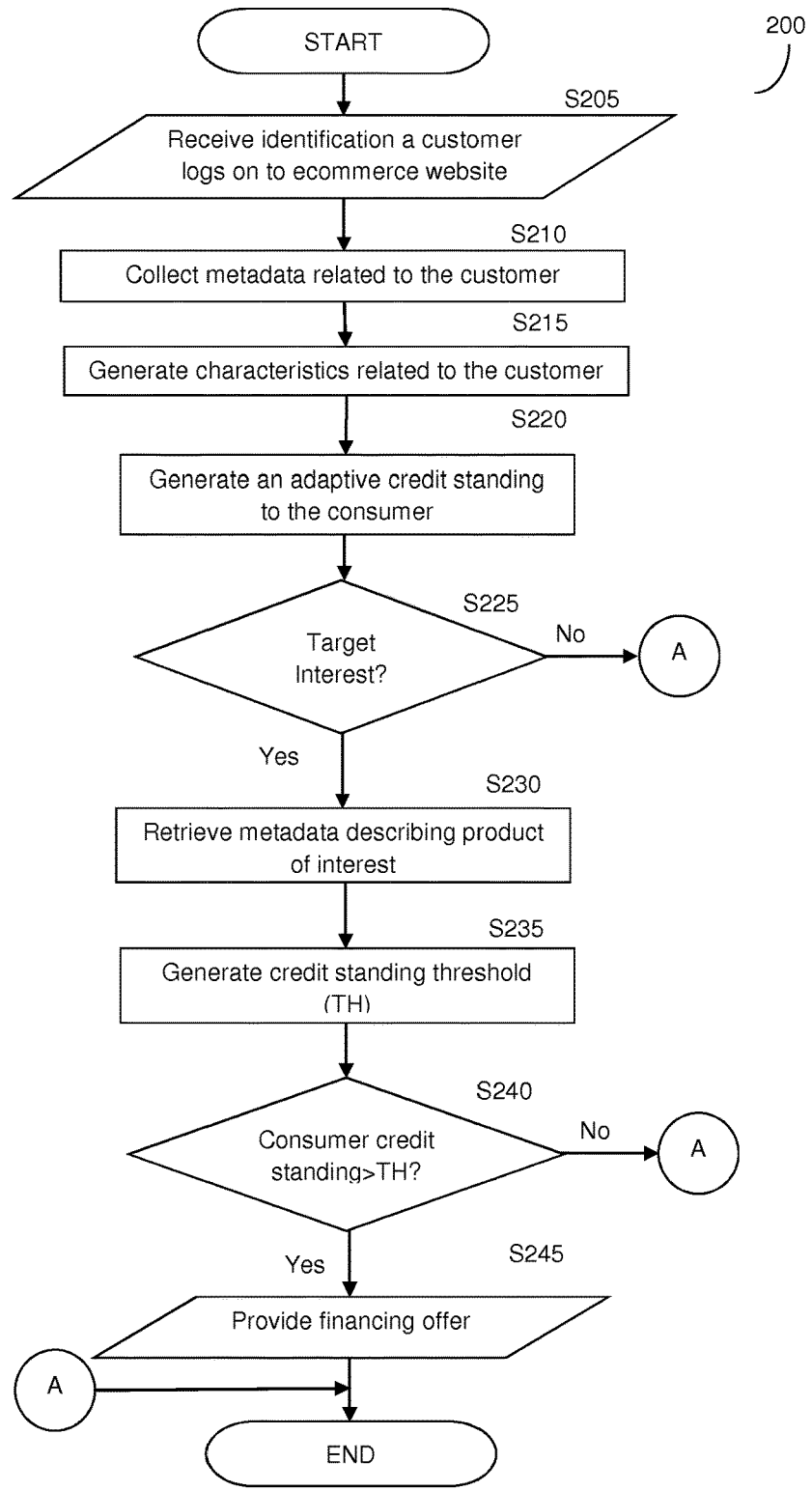
FIG. 2 is a flowchart illustrating a method for offering and enabling web-based purchase financing according to an embodiment.

FIG. 2 depicts an exemplary and non-limiting flowchart 200 illustrating a method for proactively offering financing offers to customers of e-commerce websites according to an embodiment. In S205, an identification that a customer logs on to an e-commerce website is received and acknowledged. In an exemplary and non-limiting embodiment, such an identification can be received from a script downloaded to the customer node when the customer browses the e-commerce website.

In S210, metadata related to the customer is collected. In an embodiment, the metadata may be collected implicitly by tracking the customer activity or by capturing and analyzing inputs from one or more sensors of a customer node (e.g., the customer node 110) such as, for example, a camera, a voice recorder, and the like. According to another embodiment, the data may be collected explicitly from the customer's responses to questions. Such data may be, for example, a variety of characteristics related to the customer determined via a customer node. In S215, one or more customer characteristics related to the customer are generated using the collected metadata. Customer characteristics may be, for example, facial or voice reactions, mouse scrolling and/or keyboard typing, personal information related to the customer, and information demonstrating how the user has previously interacted with a web-source.

In S220, an adaptive credit standing is generated for the customer using the generated customer characteristics. In an embodiment, a weighted decision algorithm is utilized to compute the adaptive credit standing. Accordingly, each customer characteristics is assigned with a virtual value indicating the importance of the respective parameter to the credit standing. In one embodiment, the weighted decision algorithm computes the adaptive credit standing, for example as an average sum of the virtual values.

In S225, a determination is made whether the customer associated with the customer node 110 is a target interest. In an embodiment, an indication of an interest of the customer is determined respective of a particular product or a product category. In an embodiment, such determination is made based on a purchase order (PO) received from the customer node and/or the time the customer spent on browsing the particular product or product category. In certain embodiments, if it is determined that the client does not show any interest in the product then execution ends.

In S230, metadata describing the product in interest is retrieved, for example, from the database 160. The metadata may include, for example, the product or product category in interest, their costs associated, shipping information, available quantity, and so on. In S235, a credit standing threshold (TH) is generated respective of the metadata. The credit standing threshold indicates a requirement for determining if a customer passes the minimal requirements for extending any credit.

In S240, it is checked whether the adaptive credit standing of the customer meets the credit standing threshold and, if so, execution continues with S245; otherwise, execution ends. In an embodiment, the determination is made automatically respective of metadata related to the customer stored in a database (e.g., the database 160). In S245, at least one financing offer is provided to the customer. The provided offer may be determined based on the value of the adaptive credit standing versus the credit standing threshold. In an embodiment, each of the at least one financing offer is embedded in a content item displayed on a display of the customer node 110. In certain embodiments, a notification may be displayed to the customer that there are no available financing offers when the customer's adaptive credit standing does not meet the threshold.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for proactively offering financing offers to customers of e-commerce websites, comprising:

upon identification, by a server in communication with a customer node over a communication network, that a customer logs on to an e-commerce website, collecting data related to a customer associated with said customer node, said e-commerce website includes at least one product of interest to said customer;

during interaction of said customer with said e-commerce website:

identifying at least one of facial reaction and voice reaction of said customer during said interaction, by capturing and analyzing at least one input from at least one sensor associated with said customer node and tracking the customer activity during said interaction;

generating, by said server, at least one customer characteristic of the customer based on the collected data and said identified at least one of facial reaction and voice reaction;

computing, by said server, an adaptive credit standing of the customer based on the at least one customer characteristic;

determining, by said server, whether the adaptive credit standing meets a credit standing threshold associated with said at least one product of interest; and upon determining that the adaptive credit standing meets the credit standing threshold, proactively and automatically providing by said server, in real-time, at least one financing offer to the customer associated with the customer node.

2. The method of claim 1, further comprising:

determining a target interest of the customer in the at least one product; and computing the adaptive credit standing only when the determined target interest meets a predefined interest threshold.

3. The method of claim 2, wherein determining the target interest meets a predefined interest threshold further comprises:

retrieving metadata respective of the least one product; and generating, based on the metadata, the credit standing threshold for financing the purchase.

4. The method of claim 1, wherein the at least one product is any one of: goods, a service, and a product category.

5. The method of claim 1, wherein the at least one financing offer is embedded in a content item displayed on the customer node.

6. The method of claim 1, wherein the at least one customer characteristic is any of: a facial reaction, a voice reaction, mouse scrolling, keystrokes, touch screen gestures, personal information related to the customer, and information demonstrating previous interactions of the customer.

7. The method of claim 1, wherein collecting the data related to the customer further comprises:

implicitly collecting data by at least one of: tracking customer activity and an analysis of said at least one input captured by said at least one sensor of the customer node.

8. The method of claim 1, wherein collecting the data related to the customer further comprises:

explicitly collecting data by requesting feedbacks from the customer.

9. The method of claim 1, further comprising:

determining whether the customer appears in a customers' black list;

upon determining that the customer appears in a customers' black list, determining that the credit standing does not meet the credit standing threshold.

10. The method of claim 1, wherein computing the adaptive credit standing further comprises:

assigning a virtual value to each of the at least one customer characteristic, wherein the virtual value indicates the importance of the respective customer characteristic to the adaptive credit standing; and computing a weighted sum average of the assigned virtual values to result in the adaptive credit standing.

11. The method of claim 10, wherein the virtual values are adjusted based on a total amount of data collected.

12. A non-transitory computer readable medium having stored thereon instructions for causing one or more processing units to execute the method according to claim 1.

13. A system for proactively offering financing offers to customers of e-commerce websites, comprising:
   a processing unit; and
   a memory, the memory containing instructions that, when executed by the processing unit, configure the system to:
      upon identification that a customer logs on to an e-commerce website, collect data related to a customer associated with a customer node, said e-commerce website includes at least one product of interest to said customer;
      during interaction of said customer with said e-commerce website:
         identify at least one of facial reaction and voice reaction of said customer during said interaction, by capturing and analyzing at least one input from at least one sensor associated with said customer node and tracking the customer activity during said interaction;
         generate at least one customer characteristic of the customer based on the collected data and said identified at least one of facial reaction and voice reaction;
         compute an adaptive credit standing of the customer based on the at least one customer characteristic;
         determine whether the adaptive credit standing meets a credit standing threshold associated with said at least one product of interest; and
         upon determining that the adaptive credit standing meets the credit standing threshold, proactively and automatically provide, in real-time, at least one financing offer to the customer associated with the customer node.

14. The system of claim 13, further configured to:
   determine a target interest of the customer in the at least one product; and
   compute the adaptive credit standing only when the determined target interest meets a predefined interest threshold.

15. The system of claim 14, wherein determining the target interest meets a predefined interest threshold further comprises:
   retrieving metadata respective of the least one product; and
   generating, based on the metadata, the credit standing threshold for financing the purchase.

16. The system of claim 13, wherein the at least one product is any one of: goods, a service, and a product category.

17. The system of claim 13, wherein the at least one financing offer is embedded in a content item displayed on the customer node.

18. The system of claim 13, wherein the at least one customer characteristic is any of: a facial reaction, a voice reaction, mouse scrolling, keystrokes, touch screen gestures, personal information related to the customer, and information demonstrating previous interactions of the customer.

19. The system of claim 13, wherein collecting the data related to the customer further comprises:
   implicitly collecting data by at least one of: tracking customer activity and an analysis of said at least one input captured by said at least one sensor of the customer node.

20. The system of claim 13, wherein collecting the data related to the customer further comprises:
   explicitly collecting data by requesting feedbacks from the customer.

21. The system of claim 13, further configured to:
   determine whether the customer appears in a customers' black list;
   upon determining that the customer appears in a customers' black list, determine that the credit standing does not meet the credit standing threshold.

22. The system of claim 13, wherein computing the adaptive credit standing further comprises:
   assigning a virtual value to each of the at least one customer characteristic, wherein the virtual value indicates the importance of the respective customer characteristic to the adaptive credit standing; and
   computing a weighted sum average of the assigned virtual values to result in the adaptive credit standing.

23. The system of claim 22, wherein the virtual values are adjusted based on a total amount of data collected.

24. The system of claim 13, wherein said memory further containing instructions that when executed by said processing unit, configure said system to terminate operation upon determining that the adaptive credit standing does not meet said credit standing threshold.

25. The method of claim 1 further comprising: upon said determining that the adaptive credit standing meets the credit standing threshold, sending a notification to said customer node informing said customer that an additional credit is available for said customer.

26. The method of claim 1 further comprising: upon determining that the adaptive credit standing does not meet said credit standing threshold, sending a notification to said customer node.

27. The method of claim 1, wherein said at least one sensor is at least one of a camera and a voice recorder.

28. The method of claim 1, wherein said at least one input represents an interaction of said customer with a user device associated with said customer node.

29. The system of claim 13, wherein said at least one sensor is at least one of a camera and a voice recorder.

* * * * *